US006661164B2

(12) United States Patent
Ruemmelin et al.

(10) Patent No.: US 6,661,164 B2
(45) Date of Patent: Dec. 9, 2003

(54) INCANDESCENT LAMP

(75) Inventors: Juergen Ruemmelin, Giengen (DE); Reinhard Schaefer, Heidenheim (DE)

(73) Assignee: Patent-Treund-Gesellschaft F. Elektrische Gluehlampen mbH, Munich (DE)

( * ) Notice: Subject to any disclaimer, the term of this patent is extended or adjusted under 35 U.S.C. 154(b) by 173 days.

(21) Appl. No.: 09/847,369

(22) Filed: May 3, 2001

(65) Prior Publication Data

US 2001/0043033 A1 Nov. 22, 2001

(30) Foreign Application Priority Data

May 17, 2000 (DE) ........................................ 100 23 936

(51) Int. Cl.[7] ............................ H01J 5/16; H01J 61/40; H01J 17/16; H01K 1/26; G02B 5/28

(52) U.S. Cl. ....................... 313/112; 313/580; 313/635; 359/589

(58) Field of Search ................................ 313/112, 113, 313/580, 578, 635, 315, 316, 569, 489, 493, 110, 116, 479; 359/585–589

(56) References Cited

U.S. PATENT DOCUMENTS

| | | | | |
|---|---|---|---|---|
| 5,200,855 A | * | 4/1993 | Meredith et al. | 359/588 |
| 5,552,671 A | * | 9/1996 | Parham et al. | 313/635 |
| 5,652,476 A | * | 7/1997 | Matsuda et al. | 313/478 |
| 6,356,020 B1 | * | 3/2002 | Cottaar | 313/635 |

FOREIGN PATENT DOCUMENTS

| | | | |
|---|---|---|---|
| EP | 986 093 A1 | 3/2000 | H01K/1/32 |
| EP | 0 986 093 | 3/2000 | H01K/1/32 |
| FR | 2577347 | 2/1985 | H01K/5/00 |

* cited by examiner

*Primary Examiner*—Sandra O'Shea
*Assistant Examiner*—Peter Macchiarolo
(74) *Attorney, Agent, or Firm*—William E. Meyer

(57) ABSTRACT

The invention relates to an incandescent lamp whose lamp vessel (20) has an interference filter (30) with locally differing layer thickness for producing red light. The interference filter (30) has a second absorber layer and additional layers of low optical refraction and high optical refraction for reducing its transmission in the violet, blue and green spectral regions.

10 Claims, 6 Drawing Sheets

INCANDESCENT LAMP

BACKGROUND OF THE INVENTION

Such an incandescent lamp is disclosed, for example, in the European laid-open specification EP 0 986 093 A1. This specification describes an incandescent lamp whose lamp vessel has an interference filter coating with a locally differing layer thickness. The layer thickness of the interference filter varies in such a way that all regions of the lamp vessel which is coated with the interference filter emit light of the same color composition in the switched-on state of the incandescent lamp. The incandescent lamp is designed as an automobile signal lamp emitting orange or red light.

BRIEF SUMMARY OF THE INVENTION

It is the object of the invention to provide an incandescent lamp of the generic type having an improved interference filter for producing red light. An incandescent lamp may be made having a transparent, essentially rotationally symmetrical lamp vessel (20), an incandescent filament surrounded by the lamp vessel (20), and an interference filter (30) which is arranged on the lamp vessel (20) and designed as an edge filter. The interference filter (30) has layers of low optical refraction and high optical refraction for setting the edge of the interference filter (30) in the red spectral region. The layer thicknesses of the layers of low optical refraction and high optical refraction differ locally as a function of the angle of incidence of the light emitted by the incandescent filament and impinging on the interference filter, and the interference filter (30) has absorber layers for absorbing blue and violet light. The interference filter further has at least two of these absorber layers with, in each case, an intermediate layer of low optical refraction arranged therebetween, and additional layers of low optical refraction and high optical refraction for further suppressing light from the violet and blue spectral regions.

DETAILED DESCRIPTION OF THE INVENTION

Figure 1:
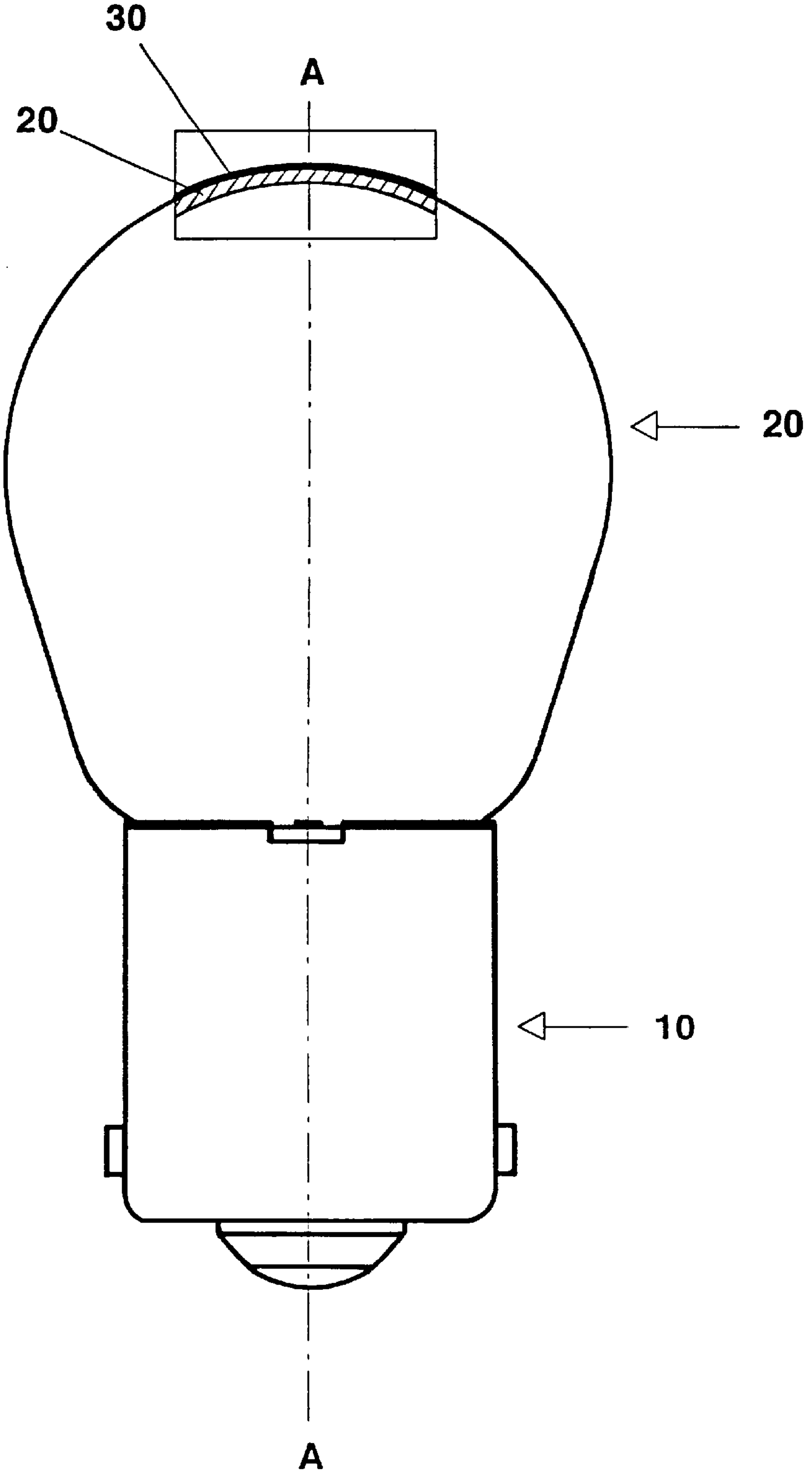
FIG. 1 shows a side view of an incandescent lamp in accordance with the preferred exemplary embodiment of the invention.
Figure 2:
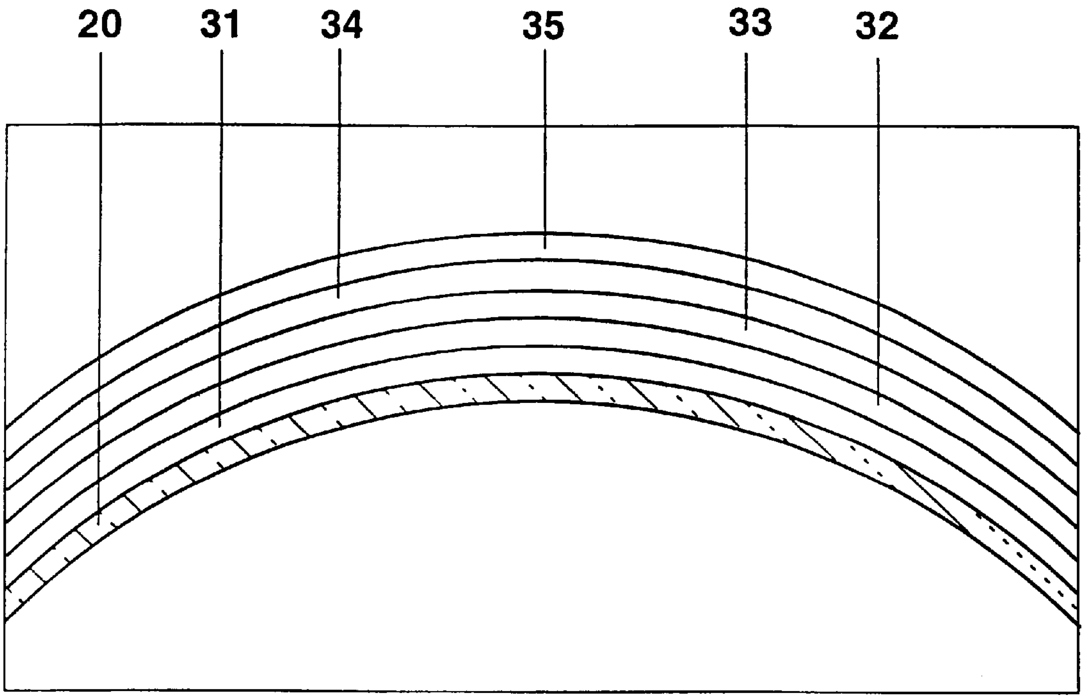
FIG. 2 shows an enlarged detail of the lamp vessel of the incandescent lamp illustrated in FIG. 1, in a sectional, schematic illustration.

The incandescent lamp according to the invention is fitted with a transparent, essentially rotationally symmetrical lamp vessel, an incandescent filament surrounded by the lamp vessel, and an interference filter which is arranged on the lamp vessel and designed as an edge filter, the interference filter having layers of low optical refraction and of high optical refraction for setting the edge of the interference filter in the red spectral region. The layer thicknesses of the layers of low optical refraction and high optical refraction differ locally as a function of the angle of incidence of the light emitted by the incandescent filament and impinging on the interference filter. According to the invention, the interference filter also has at least two absorber layers with, in each case, an intermediate layer of low optical refraction arranged therebetween for absorbing blue and violet light, as well as additional layers of low optical refraction and high optical refraction for further suppressing light from the violet and blue spectral regions. These measures ensure that the incandescent lamp according to the invention emits essentially red light and is suitable for use as a stop light lamp or tail light lamp of an automobile.

The interference filter advantageously comprises at least four stacks of layers, the first stack being arranged directly on the lamp vessel and including the at least two absorber layers with in each case an intermediate layer of low optical refraction arranged there between for absorbing blue and violet light, and at least one of the subsequent stacks including the additional layers of low optical refraction and high optical refraction, the layer thicknesses thereof being optimized in such a way that this at least one stack has a low transmission for light from the violet and blue spectral regions and a high transmission for light from the red spectral region, and the other stacks including the layers of low optical refraction and high optical refraction for setting the edge of the interference filter in the red spectral region. The layer thicknesses of the layers of low optical refraction and high optical refraction in these stacks are optimized in such a way that the edge of the interference filter is situated in the wavelength region from 580 nm to 600 nm. In this way, an interference filter with comparatively few layers can be produced which has in the wavelength region from 580 nm to 600 nm a steep transition from the spectral region of low transmission to the spectral region of high transmission.

The first stack advantageously includes at least two absorber layers made from iron oxide $Fe_2O_3$ with in each case a layer of low optical refraction arranged therebetween. Iron oxide is a material with a comparatively high index of optical refraction. Given a sufficiently thin layer thickness, the iron oxide layers have metallic properties in the violet and blue spectral regions and dielectric properties in the red spectral region. Given the respective intermediate layer of low optical refraction, it is possible by adapting and optimizing its layer thickness to make use of the interference effect in combination with the iron oxide layers of high optical refraction in order to achieve a high transmission of the first stack for light from the red spectral region, and a high reflection of the first stack for light from the blue spectral region.

Figure 9:
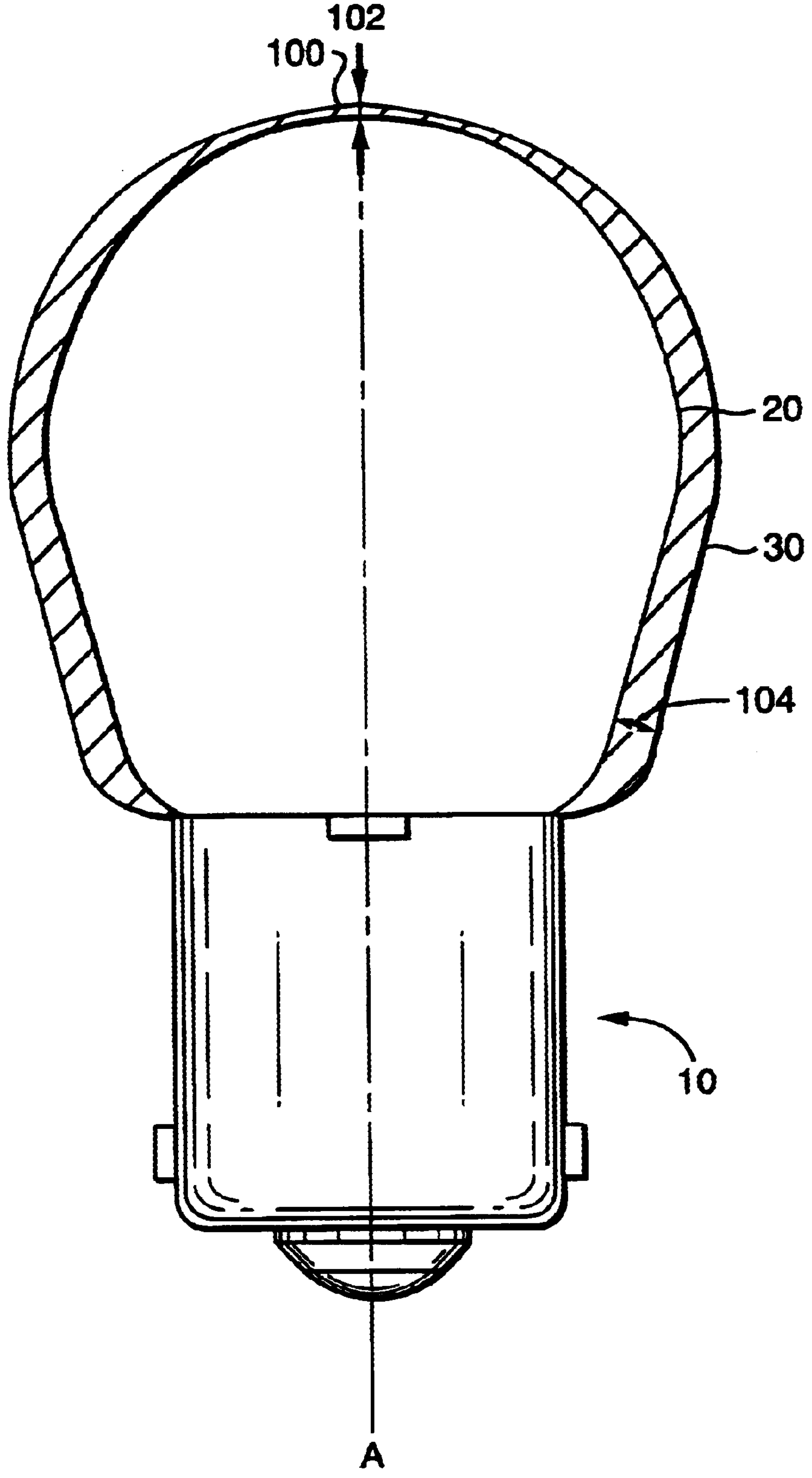
FIG. 9 shows a side view of an incandescent lamp with a coating having an exaggerated thickness variation.

The preferred exemplary embodiment of the invention concerns an incandescent lamp with an electric power consumption of approximately 25 W, which can be used, for example, as a light source in the tail lamp for producing the tail light or stop light. This incandescent lamp has a bayonet-type lamp base 10 and a pear-shaped glass lamp vessel 20 which is rotationally symmetrical about the lamp axis A—A and surrounds an incandescent filament (not illustrated). The outer surface of the lamp vessel 20 is coated with an interference filter 30 which has a high transmission for red light and is virtually opaque to light of other spectral regions. The layer thickness of the interference filter 30 varies locally as a function of the angle of incidence of the light emitted by the incandescent filament and impinging on the interference filter 30. The interference filter 30 has the least layer thickness 100 on the crest 102 of the lamp vessel 20 and the greatest layer thickness 104 in the vicinity of the base. The layer thickness of the interference filter 30 increases continuously from the crest 102 to the base 10. The difference between the least 100 and the greatest layer thickness 104 is approximately 7 percent. The layer thickness of the interference filter 30 is constant along concentric rings about the lamp axis A—A. FIG. 9 shows a side view of an incandescent lamp with a coating having an exaggerated thickness variation. The interference filter 30 comprises a total of 28 layers which are arranged in five stacks 31–35.

Figure 3:
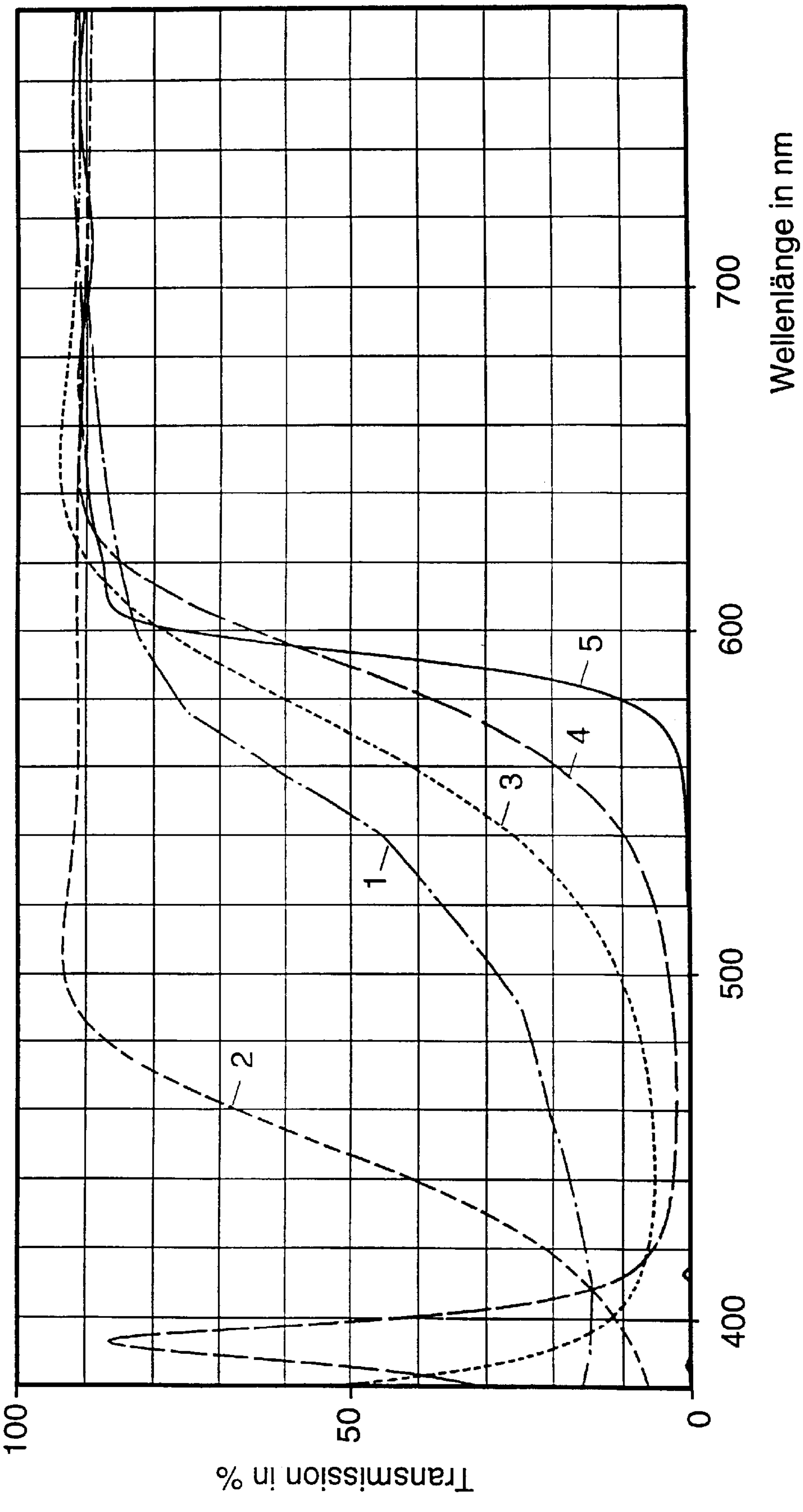
FIG. 3 shows transmission curves of the interference filter and the individual stacks of the interference filter of the incandescent lamp in accordance with the preferred exemplary embodiment.
Figure 4:
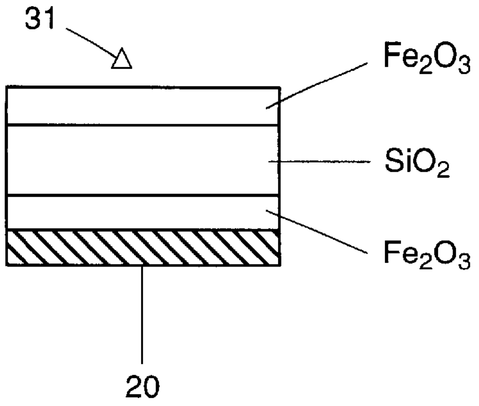
FIGS. 4–8 show the layered coatings.

The first stack 31, FIG. 4, which is applied directly on the lamp vessel 20, comprises a first absorber layer made from $Fe_2O_3$ with a physical layer thickness of approximately 8 nm, and a second absorber layer made from $Fe_2O_3$ with a physical layer thickness of approximately 14 nm, as well as an intermediate layer, made from $SiO_2$, of low optical refraction which is arranged between the two absorber layers and has a physical layer thickness of approximately 87 nm. The transmission response of the first stack 31 is illustrated in FIG. 3 as a function of the optical wavelength by the curve 1.

Figure 5:
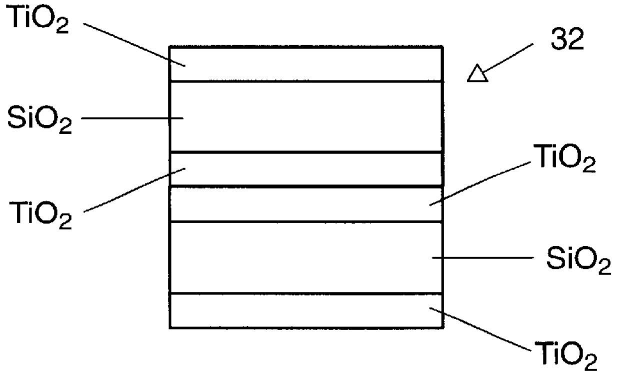

The second stack 32, FIG. 5, is formed from a layer sequence which is repeated once and comprises a layer of high optical refraction made from $TiO_2$ with a physical layer thickness of approximately 12 nm, a layer of low optical refraction made from $SiO_2$ with a physical layer thickness of approximately 40 nm, and a layer of high optical refraction made from $TiO_2$ with a physical layer thickness of 25 nm. The second stack 32 is optional. It brings about an additional reduction in the transmission of the interference filter 30 in the violet spectral region. Its transmission response is not illustrated in FIG. 3.

Figure 6:
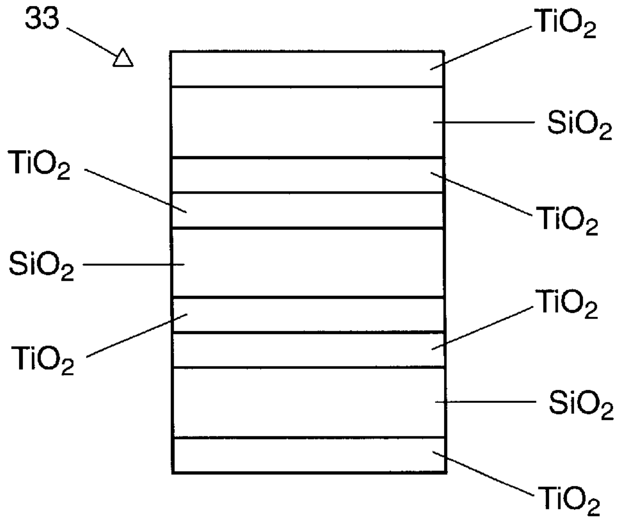

The third layer 33, FIG. 6, is formed by a layer sequence which is repeated twice and comprises a layer of high optical refraction made from $TiO_2$ with a physical layer thickness of approximately 14 nm, a layer of low optical refraction made from $SiO_2$ with a physical layer thickness of 77 nm, and a layer of high optical refraction made from $TiO_2$ with a physical layer thickness of approximately 14 nm. This third stack 33 has a low transmission for light from the violet and blue spectral regions, and a high transmission for light from the red spectral region. In addition to the absorption filter it serves the purpose of additionally suppressing violet and blue light. The transmission response of the third stack 33 is illustrated in FIG. 3 as a function of the optical wavelength by the curve 2.

Figure 7:
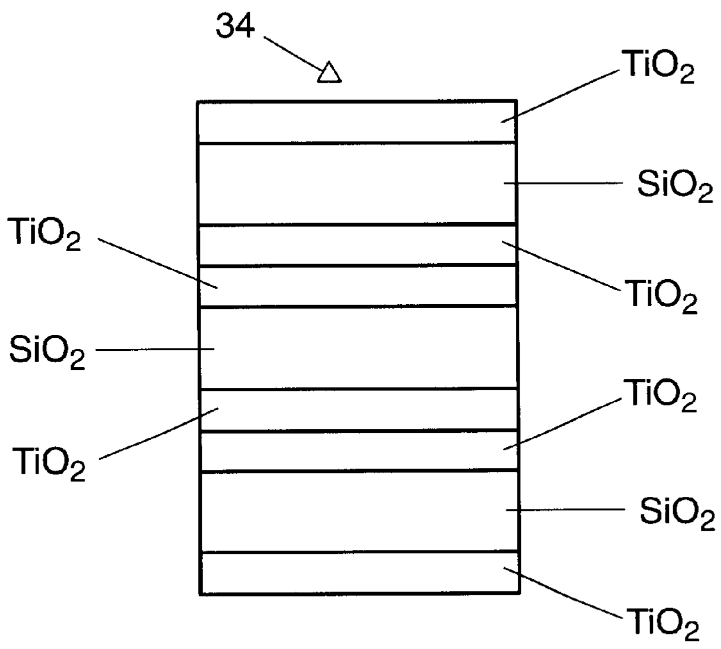

The fourth stack 34, FIG. 7, is formed by a layer sequence which is repeated twice and comprises a layer of high optical refraction made from $TiO_2$ with a physical layer thickness of approximately 24 nm, a layer of low optical refraction made from $SiO_2$ with a physical layer thickness of 79 nm, and a layer of high optical refraction made from $TiO_2$ with a physical layer thickness of 24 nm. The curve 3 in FIG. 3 shows the transmission response of the fourth stack 34 as a function of the optical wavelength.

Figure 8:
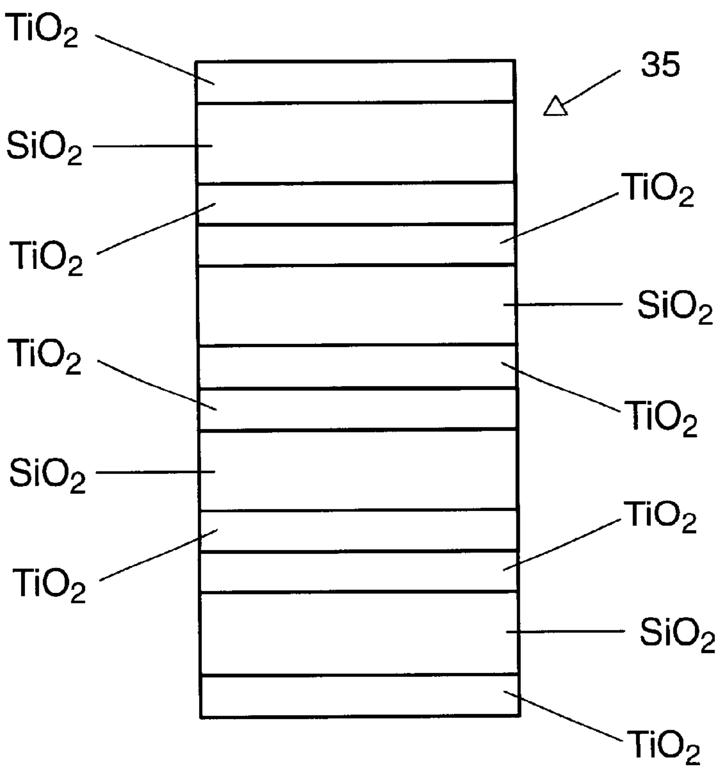

The fifth stack 35, FIG. 8, is formed from a layer sequence which is repeated three times and comprises a layer of high optical refraction made from $TiO_2$ with a physical layer thickness of approximately 25 nm, a layer of low optical refraction made from $SiO_2$ with a physical layer thickness of 86 nm, and a layer of high optical refraction made from $TiO_2$ with a physical layer thickness of 24 nm. The curve 4 in FIG. 3 shows the transmission response of the fifth stack 35 as a function of the optical wavelength. All data on layer thickness relate to the crest of the lamp vessel 20.

The fourth stack 34 and fifth stack 35 serve to set the edge of the interference filter 30 at approximately 590 nm. The layer thicknesses of the $SiO_2$ and $TiO_2$ layers of these two stacks are optimized in such a way that the interference filter 30 has a steep transition from the short-wave spectral region of low transmission to the long-wave spectral region of high transmission in the case of an optical wavelength of approximately 590 nm. The transmission response of the overall interference filter 30 is illustrated in FIG. 3 as a function of the optical wavelength by the curve 5. The five stacks 31–35 follow one another seamlessly. The interference filter 30 therefore has 28 layers.

What is claimed is:

1. An incandescent lamp comprising: a transparent, essentially rotationally symmetrical lamp vessel (20), an incandescent filament surrounded by the lamp vessel (20), and an interference filter (30) which is arranged on the lamp vessel (20) and designed as an edge filter, the interference filter (30) having layers of low optical refraction and high optical refraction for setting the edge of the interference filter (30) in the red spectral region, the layer thicknesses of the layers of low optical refraction and high optical refraction differing locally as a function of the angle of incidence of the light emitted by the incandescent filament and impinging on the interference filter, and the interference filter (30) having absorber layers of different material than those of the layers of low optical refraction and high optical refraction for absorbing blue and violet light, wherein the interference filter has at least two of these absorber layers of iron oxide with, in each case, an intermediate layer of low optical refraction arranged therebetween, and additional layers of low optical refraction and high optical refraction for further suppressing light from the violet and blue spectral regions.

2. The incandescent lamp as claimed in claim 1, wherein the interference filter comprises at least four stacks (31, 33, 34, 35) of layers, the first stack (31), which is arranged directly on the lamp vessel (20), including the at least two absorber layers with the intermediate layer of low optical refraction arranged therebetween, at least one of the subsequent stacks (33) including the additional layers of low optical refraction and high optical refraction, the layer thicknesses thereof being optimized in such a way that this at least one stack (33) has a low transmission for light from the violet and blue spectral regions and a high transmission for light from the red spectral region, and the other stacks (34, 35) including the layers of low optical refraction and high optical refraction for setting the edge of the interference filter (30) in the red spectral region, the layer thicknesses of the layers of low optical refraction and high optical refraction in these stacks (34, 35) being optimized in such a way that the edge of the interference filter (30) is situated in the wavelength region from 580 nm to 600 nm.

3. The incandescent lamp as claimed in claim 1 wherein the at least two absorber layers consist of iron oxide, and the layer thicknesses of the at least two absorber layers are optimized such that the absorber layers have metallic properties in the violet and blue spectral regions and dielectric properties in the red spectral region, and with the layer thickness of the respective intermediate layer being optimized in such a way and being tuned to the layer thicknesses of the at least two absorber layers in such a way that the respective intermediate layer and the at least two absorber layers have a high transmission in the red spectral region.

4. The incandescent lamp as claimed in claim 1, wherein the lamp is an automobile lamp.

5. The incandescent lamp as claimed in claim 4, wherein the lamp is an automobile tail lamp.

6. The incandescent lamp as claimed in claim 2, wherein the at least two absorber layers consist of iron oxide, and the layer thicknesses of the at least two absorber layers are optimized such that the absorber layers have metallic properties in the violet and blue spectral regions and dielectric properties in the red spectral region, and with the layer thickness of the respective intermediate layer being optimized in such a way and being tuned to the layer thicknesses of the at least two absorber layers in such a way that the respective intermediate layer and the at least two absorber layers have a high transmission in the red spectral region.

7. The incandescent lamp as claimed in claim 2, wherein the lamp is an automobile lamp.

8. The incandescent lamp as claimed in claim 7, wherein the lamp is an automobile tail lamp.

9. The incandescent lamp as claimed in claim 3, wherein the lamp is an automobile lamp.

10. The incandescent lamp as claimed in claim 9, wherein the lamp is an automobile tail lamp.

* * * * *